US010989073B2

(12) United States Patent
Gebhard et al.

(10) Patent No.: US 10,989,073 B2
(45) Date of Patent: Apr. 27, 2021

(54) POWER GEARBOX WITH EMBEDDED OIL RESERVOIR FOR USE IN A GAS TURBINE ENGINE

(71) Applicant: Rolls-Royce Corporation, Indianapolis, IN (US)

(72) Inventors: John R. Gebhard, Fishers, IN (US); Adam L. Kempers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 154 days.

(21) Appl. No.: 16/293,079

(22) Filed: Mar. 5, 2019

(65) Prior Publication Data

US 2020/0284164 A1      Sep. 10, 2020

(51) Int. Cl.
*F01D 25/18*     (2006.01)
*F16H 57/04*     (2010.01)

(52) U.S. Cl.
CPC ........... *F01D 25/18* (2013.01); *F16H 57/045* (2013.01); *F16H 57/0424* (2013.01); *F16H 57/0456* (2013.01); *F16H 57/0479* (2013.01); *F16H 57/0486* (2013.01); *F05D 2260/4031* (2013.01); *F05D 2260/98* (2013.01)

(58) Field of Classification Search
CPC .. F01D 25/18; F05D 2260/40311; F02C 7/06; F02C 7/36; F16H 57/0479; F16H 57/045; F16H 57/0456
See application file for complete search history.

(56) References Cited

U.S. PATENT DOCUMENTS

| 4,271,928 | A | * | 6/1981 | Northern | ................. | B64C 27/12 |
| | | | | | | 184/6.4 |
| 4,858,427 | A | * | 8/1989 | Provenzano | .............. | F16N 9/02 |
| | | | | | | 60/39.08 |
| 8,215,454 | B2 | | 7/2012 | Portlock et al. | | |
| 8,230,974 | B2 | | 7/2012 | Parnin | | |
| 8,622,176 | B2 | | 1/2014 | Bell et al. | | |
| 8,651,240 | B1 | * | 2/2014 | Motto | ...................... | F01D 25/18 |
| | | | | | | 184/7.4 |
| 8,820,478 | B2 | * | 9/2014 | Gauthier | ................. | F02C 3/107 |
| | | | | | | 184/6.12 |
| 8,870,699 | B2 | * | 10/2014 | Lewis | ................. | F16H 57/0486 |
| | | | | | | 475/159 |
| 8,876,647 | B2 | * | 11/2014 | Gallet | ................... | F16H 57/042 |
| | | | | | | 475/159 |
| 9,194,294 | B2 | | 11/2015 | Suciu et al. | | |
| 9,879,608 | B2 | * | 1/2018 | Sheridan | ............. | F16H 57/0486 |
| 10,072,582 | B2 | | 9/2018 | Wotzak | | |
| 10,280,795 | B2 | * | 5/2019 | Lao | ...................... | F16H 57/0479 |
| 10,704,669 | B2 | * | 7/2020 | Charrier | ............. | F16H 57/0427 |
| 2013/0319006 | A1 | | 12/2013 | Parnin | | |
| 2016/0363211 | A1 | | 12/2016 | Bradley | | |
| 2016/0377166 | A1 | | 12/2016 | Sheridan | | |
| 2017/0307061 | A1 | | 10/2017 | Gravina et al. | | |

* cited by examiner

*Primary Examiner* — Nathaniel E Wiehe
*Assistant Examiner* — Jackson N Gillenwaters
(74) *Attorney, Agent, or Firm* — Barnes & Thornburg LLP

(57) ABSTRACT

A gas turbine engine includes an engine core, a power gearbox, and a lubrication system. The engine core is configured to drive rotation of at least one shaft. The power gearbox is configured to transfer torque from the at least one shaft to other parts of the gas turbine engine. The lubrication system is configured to deliver lubrication to the power gearbox to reduce friction and cool rotating components within the power gearbox.

18 Claims, 3 Drawing Sheets

POWER GEARBOX WITH EMBEDDED OIL RESERVOIR FOR USE IN A GAS TURBINE ENGINE

FIELD OF THE DISCLOSURE

The present disclosure relates to gas turbine engines, particularly to gas turbine engines including gearboxes with rotating components. More particularly, the present disclosure relates to lubrication systems for gas turbine engine gearboxes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Bearing assemblies are typically used to transfer loads between a rotating component and a fixed component or between two rotating components that move relative to one another in gas turbine engines. These bearing assemblies may be rotated at high speeds and may be subject to friction and/or elevated temperatures due to the high rotational speeds. Lubricants, such as oil, may be used to reduce friction in a bearing assembly and remove heat generated in the bearing assembly during operation.

SUMMARY

The present disclosure may comprise one or more of the following features and combinations thereof.

According to a first aspect of the present disclosure, a gas turbine engine includes an engine core, a planetary gearbox, and a lubrication system. The engine core is configured to provide power for the gas turbine engine and includes a fan, a compressor, a combustor, and a turbine arranged along a central reference axis. The turbine includes a first turbine stage coupled with the compressor and configured to drive the compressor and a second turbine stage coupled with the fan and configured to drive the fan during use of the gas turbine engine. The planetary gearbox is coupled with the second turbine stage and the fan to transmit power from the second turbine stage to the fan during use of the gas turbine engine. The planetary gearbox includes a plurality of gears configured to rotate about the central reference axis during use of the gas turbine engine. The lubrication system is adapted to provide lubrication to the planetary gearbox and includes an annular tank and a plurality of injectors in fluid communication with the annular tank and arranged to conduct lubrication to the planetary gearbox.

In some embodiments, the annular tank is coupled with at least one of the plurality of gears for rotation with the at least one of the plurality of gears about the central reference axis during use of the gas turbine engine to cause lubrication in the annular tank to overcome a force of gravity and form a ring of lubrication that supplies the plurality of injectors so that a flow of lubrication to the planetary gearbox through the plurality of injectors is maintained during a zero g-force event to prevent degradation of the planetary gearbox caused by a deficiency of lubrication during the zero g-force event.

In some embodiments, the plurality of gears include a pinion gear coupled with the second turbine stage, a plurality of planetary gears arranged circumferentially around the pinion gear, and a ring gear coupled with the fan and arranged circumferentially around the planetary gears. The annular tank is coupled with the plurality of planetary gears for rotation about the central reference axis with the plurality of planetary gears.

In some embodiments, the plurality of injectors are coupled with the annular tank for rotation with the annular tank about the central reference axis and the plurality of injectors are oriented to conduct lubrication from the annular tank toward the plurality of planetary gears so that lubrication is conducted continuously toward the plurality of planetary gears during rotation of the planetary gears and the annular tank about the central reference axis.

In some embodiments, each of the plurality of planetary gears includes a gear body and a plain bearing adapted to rotate about a shaft and the plurality of injectors are oriented to conduct lubrication into the plain bearings.

In some embodiments, the lubrication system further includes a controller configured to control a flow of lubrication to the plurality of injectors and the controller is configured to detect zero g-force events and allow the flow of lubrication to the plurality of injectors in response to detecting the zero g-force event and to block the flow of lubrication to the plurality of injectors in response to no zero g-force event being detected.

In some embodiments, the lubrication system further includes a second tank that is fixed relative to the central reference axis and a plurality of second injectors configured to supply lubrication from the second tank to the planetary gearbox.

In some embodiments, the plurality of gears include a pinion gear, a plurality of planetary gears arranged circumferentially around the pinion gear, and a ring gear arranged circumferentially around the planetary gears and the annular tank is rotatably coupled with one of the pinion gear and the ring gear for rotation about the central reference axis.

In some embodiments, the annular tank includes a radial inner wall arranged circumferentially around the central reference axis and a radial outer wall arranged circumferentially around the radial inner wall and the radial inner wall is formed to define a plurality of feed holes to allow lubrication to flow radially outward through the radial inner wall into the annular tank and toward the radial outer wall.

According to another aspect of the present disclosure, a gas turbine engine includes an engine core that includes a compressor, a combustor, and a turbine, a planetary gearbox coupled with the turbine and including a plurality of gears configured to rotate about an axis during use of the gas turbine engine, and a lubrication system that includes a tank and an injector in fluid communication with the tank and arranged to conduct lubrication to the planetary gearbox, and the tank being coupled with at least one gear included in the plurality of gears for rotation with the at least one gear about the axis during use of the gas turbine engine. In some embodiments, the tank is the only lubrication source that supplies lubrication to the planetary gearbox.

According to another aspect of the present disclosure, a method includes: providing a planetary gearbox including a pinion gear coupled with an output shaft for rotation about a central reference axis with the output shaft and a plurality of planetary gears disposed radially outward from and circumferentially around the pinion gear; mounting an oil tank to the planetary gearbox; and rotating simultaneously the output shaft and the oil tank to impart centrifugal forces on lubrication contained within the oil tank such that the lubrication may be forced out of the oil tank by the centrifugal forces on demand.

In some embodiments, the method further includes releasing a stream of oil from the oil tank toward each of the planetary gears during a zero-gravity event.

In some embodiments, each of the planetary gears includes an internal journal bearing and the oil tank is configured to inject oil onto each of the internal journal bearings to reduce degradation of the journal bearings.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION

Figure 1:
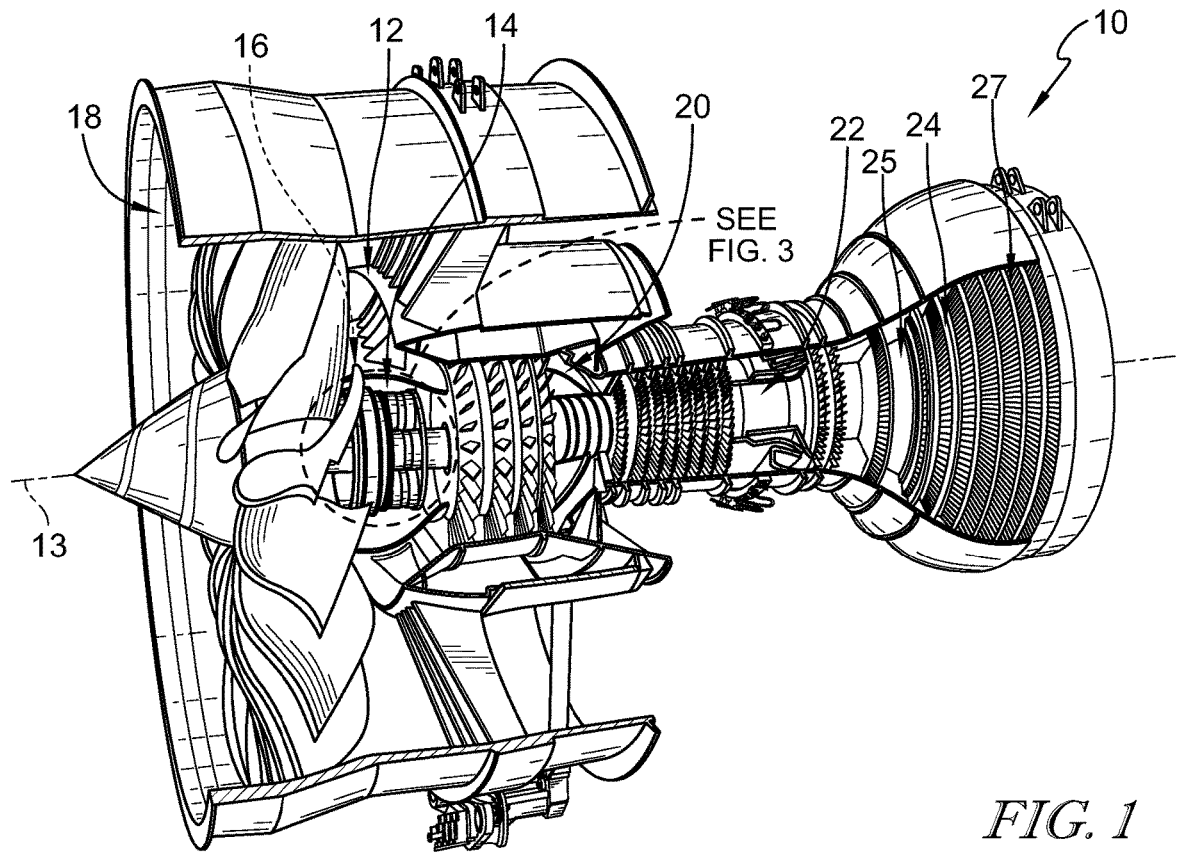
FIG. 1 is a perspective view of a gas turbine engine in accordance with the present disclosure, the gas turbine engine including a fan and an engine core having a compressor, a combustor, and turbine and a power gearbox located between the fan and the compressor to transfer torque from the turbine to the fan to provide thrust for the engine and further including a lubrication system coupled to the power gearbox for rotation therewith and configured to supply lubrication to the power gearbox.

For the purposes of promoting an understanding of the principles of the disclosure, reference will now be made to a number of illustrative embodiments illustrated in the drawings and specific language will be used to describe the same.

Figure 2:
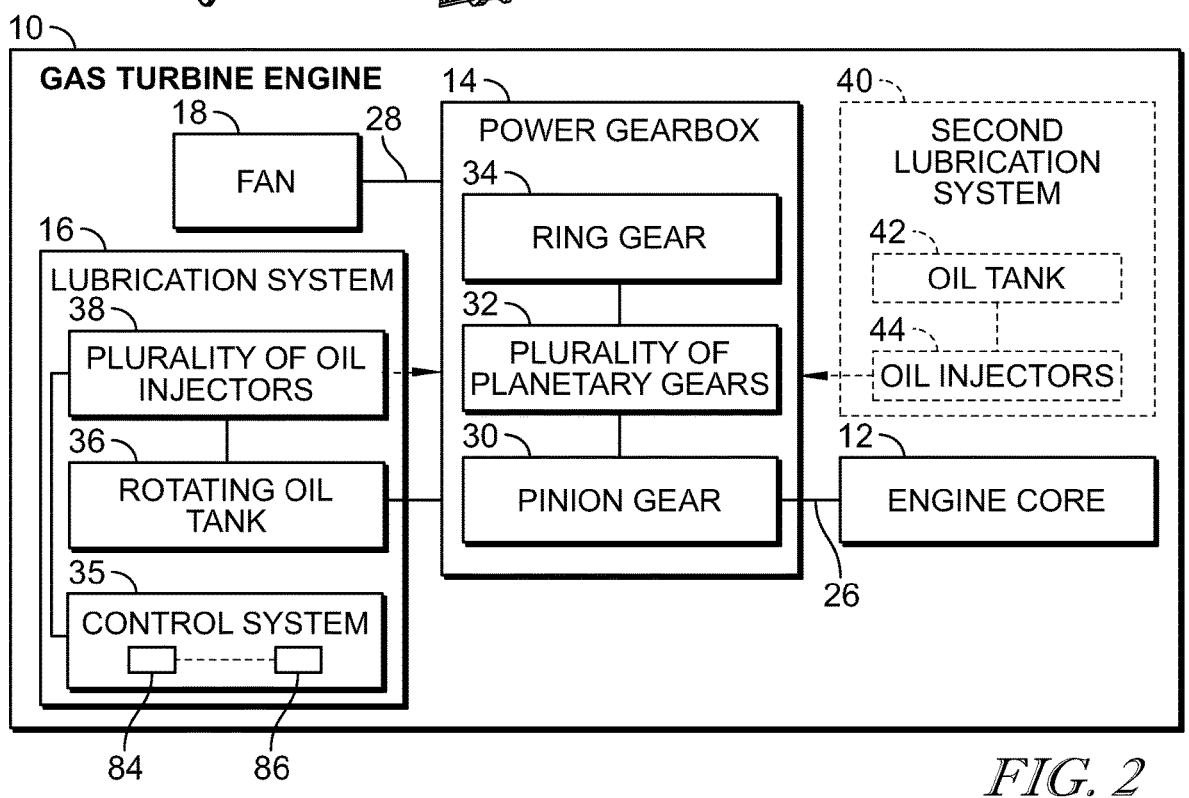
FIG. 2 is a diagrammatic view of the gas turbine engine of FIG. 1 showing that the lubrication system includes an oil tank and a plurality of side injectors coupled to the oil tank and configured to deliver a stream of oil from the oil tank to the power gearbox and suggesting that the oil tank is configured to rotate with components of the power gearbox so that oil flow is maintained to the gearbox even during a zero-gravity event to minimize degradation of the power gearbox.

An illustrative gas turbine engine 10 includes an engine core 12, a planetary gearbox 14 (or power gearbox), and a lubrication system 16 as shown in FIGS. 1 and 2. The engine core 12 is configured to rotate about a central reference axis 13 and provides thrust for a vehicle during operation of the gas turbine engine 10. The planetary gearbox 14 is configured to transfer torque between the engine core 12 and a fan 18. The lubrication system 16 is configured to selectively deliver a stream of lubrication to the planetary gearbox 14 to cool and reduce friction between rotating components within the planetary gearbox 14.

The engine core 12 includes a compressor 20, a combustor 22, and a turbine 24 as shown in FIG. 1. The fan 18 is coupled to the turbine 24 via the gearbox 14 and provides the thrust for propelling a vehicle such as, for example, an aircraft. The compressor 20 compresses and delivers air to the combustor 22. The combustor 22 mixes fuel with the compressed air received from the compressor 20 and ignites the fuel. The hot, high-pressure products of the combustion reaction in the combustor 22 are directed into the turbine 24 to cause the turbine 24 to rotate about a central reference axis 13 and drive the compressor 20 and the fan 18.

In the illustrative embodiment, the turbine 24 includes a first turbine stage 25 coupled with the compressor and configured to drive the compressor and a second turbine stage 27 coupled with the fan and configured to drive the fan. The planetary gearbox 14 is coupled with the second turbine stage 27 and the fan 18 to transmit power from the second turbine stage 27 to the fan during use of the gas turbine engine. The second turbine stage 27 outputs torque through a low pressure shaft 26 as shown in FIG. 2. The planetary gearbox 14 transfers the torque from the low pressure shaft 26 to an output shaft 28 for high-torque applications such as, for example, for rotating a relatively large fan 18. The fan 18 is coupled with the output shaft 28 to receive the torque provided by the planetary gearbox 14 during operation of the gas turbine engine 10.

Illustratively, the first turbine stage 25 is a high-pressure turbine stage. The second turbine stage 27 is a low-pressure turbine stage located downstream of the first turbine stage 25 and configured to rotate relative to the first turbine stage 25.

The planetary gearbox 14 includes a pinion gear 30 and a plurality of planetary gears 32 as shown in FIG. 2. The illustrative planetary gearbox further 14 includes a ring gear 34 as shown in FIG. 2. The pinion gear 30 is coupled to the low pressure shaft 26 for rotation therewith about the central reference axis 13. The plurality of planetary gears 32 are meshed with the pinion gear 30 and are driven around the central reference axis 13 by the pinion gear 30 as the low pressure shaft 26 rotates. The ring gear 34 is coupled to the plurality of planetary gears 32 and may be stationary or rotating depending on how the shafts 26, 28 are being driven. In some embodiments, the ring gear 34 may be omitted from the planetary gearbox 14.

Figure 3:
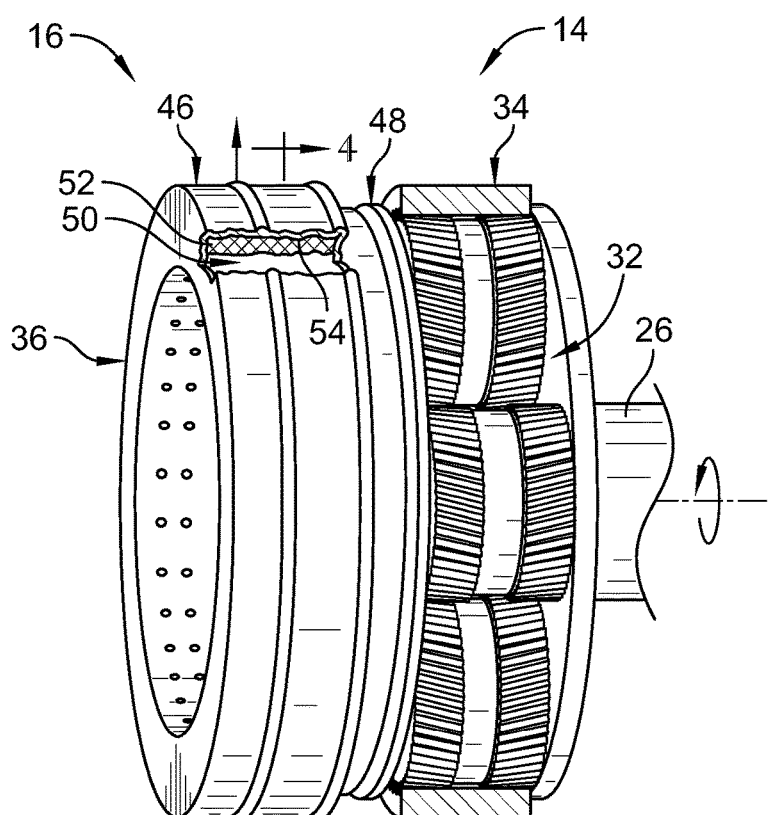
FIG. 3 is a perspective view of the power gearbox and the oil tank of FIG. 1 with portions broken away and showing that the oil tank is annular and suggesting that the oil tank is configured to rotate about a central reference axis to impart centrifugal forces on the oil located in the oil tank so that the oil is urged radially outward and supplied to each of the injectors.
Figure 4:
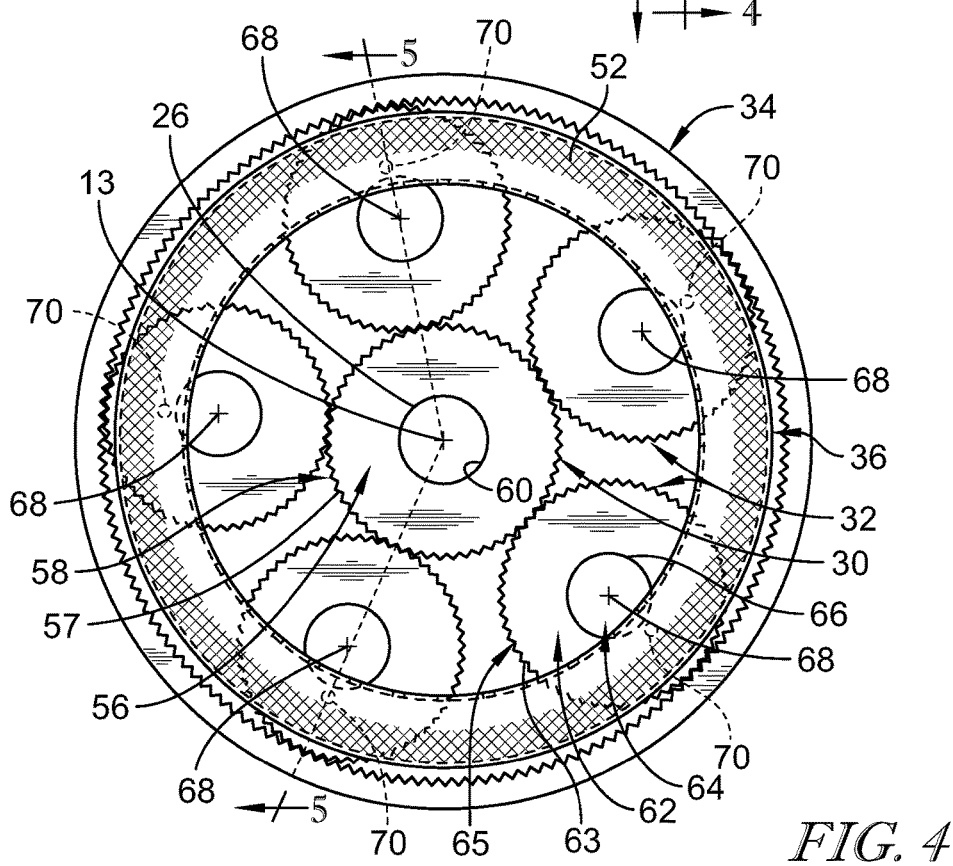
FIG. 4 is a front elevation view of the oil tank and the power gearbox showing that the power gearbox includes a pinion gear, a plurality of planetary gears spaced circumferentially around the pinion gear relative to the central reference axis, and a ring gear arranged around the planetary gears and further showing a plain bearing disposed within a central journal opening of each of the planetary gears and each of the injectors includes an outlet positioned directly adjacent to one of the plain bearings.
Figure 5:
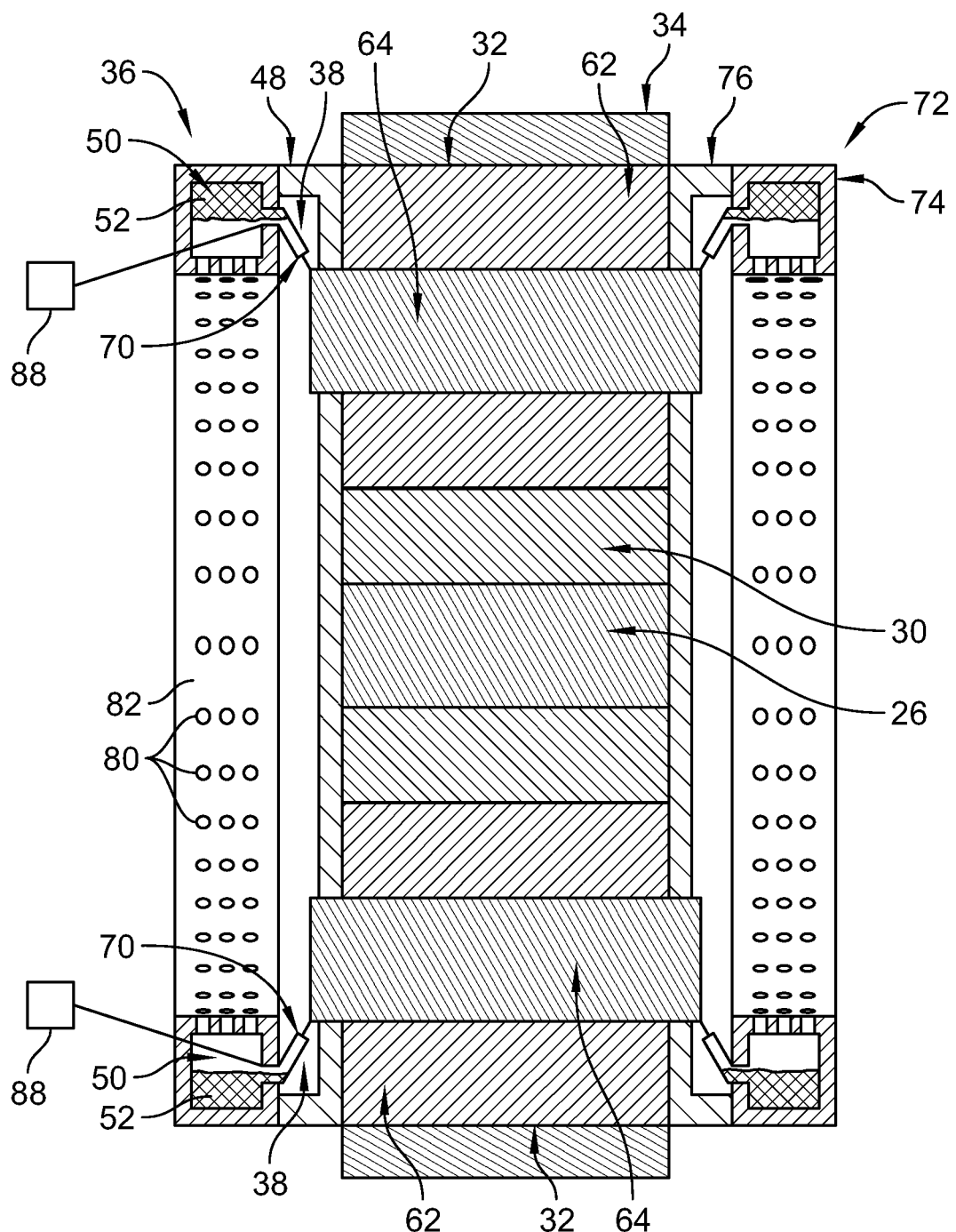
FIG. 5 is a section view of the power gearbox and lubrication system taken along line 5-5 in FIG. 4 showing that the gas turbine engine may further include a lubrication system located axially-aft of the power gearbox and showing that each of the oil tanks are formed to include a plurality of perforations in a radially-inner surface of the tanks to allow scavenged lubrication to enter each oil tank.

The lubrication system 16 is configured to deliver the stream of lubrication to the planetary gearbox 14 during operation of the gas turbine engine 10 to cool and reduce friction experienced by the gears 30, 32, 34 as suggested in FIGS. 2-5. The lubrication system 16 includes a rotating oil tank 36 and a plurality of injectors 38 as shown in FIG. 5. The oil tank 36 is mounted to the planetary gearbox 14 for rotation about the central reference axis 13. The plurality of injectors 38 are coupled with the oil tank 36 for rotation therewith and each injector 38 is configured to deliver a stream of lubrication to discrete locations within the planetary gearbox 14.

In some embodiments, the lubrication system 16 is a first lubrication system 16 and the gas turbine engine 10 further includes a second lubrication system 40 with an auxiliary oil tank 42 and injectors 44 as shown in FIG. 2. Although the oil tank 42 is referred to as an auxiliary oil tank, the oil tank 42 may be the gas turbine engine's main oil tank used to deliver a lubrication source to the planetary gearbox 14 while the rotating oil tank 36 is used in certain circumstances.

In the illustrative embodiment, the rotating oil tank 36 is mounted to the plurality of planetary gears 32 for rotation therewith about the central reference axis 13 as suggested in FIG. 3. The oil tank 36 includes a housing 46 and a mount 48 that is attached to the plurality of planetary gears 32 to secure the oil tank to the planetary gearbox 14. The housing 46 is annular and forms a full hoop circumferentially around the central reference axis 13. In other embodiments, the oil tank 36 may not be annular and may include any suitable shape for rotation about the central reference axis 13.

The oil tank 36 is formed to include an internal chamber 50 that stores lubrication 52 as shown in FIGS. 3 and 4. As the oil tank 36 is rotated about the central reference axis 13, centrifugal forces 51 are imparted on the lubrication 52 within the internal chamber 50 to cause the lubrication 52 to move toward a radially-outer surface 54 defining a portion of the internal chamber 50. The centrifugal forces 52 provide sufficient pressure between the lubrication 52 and the radially-outer surface 54 to release the lubrication 52 from the internal chamber 50 and to deliver the streams of lubrication to the planetary gearbox 14. In some embodiments, the oil tank 36 may be coupled to the pinion gear 30 or the ring gear 34.

The pinion gear 30 includes a gear body 56 with an outer surface 57 and an inner surface 60 that engages the low pressure shaft 26 as shown in FIG. 4. The outer surface 57 has a plurality of splines 58 the engage the planetary gears 32 to drive rotation of the planetary gears 32. The inner surface 60 of the gear body 56 may be fixed to the low pressure shaft 26 using any suitable method such as, for example welding, brazing, or diffusion bonding. In some embodiments, the pinion gear 30 may be omitted and the low pressure shaft 26 may include splines axially aligned with the planetary gears 32 to engage with and drive rotation of the planetary gears 32.

The power gearbox 14 illustratively includes five planetary gears 32 disposed radially outward from and circumferentially around the pinion gear 30 as shown in FIGS. 3 and 4. In other embodiments, more or less planetary gears 32 may be used. Each of the planetary gears 32 includes a gear body 62 and a plain bearing 64 (sometimes called a journal bearing). Each gear body 62 has an outer surface 63 with a plurality of splines 65 that correspond to the splines 58 formed on the pinion gear 30. The plain bearings 64 are mounted to a carrier, such as the mount 48 of the oil tank 36, to transfer torque from the planetary gearbox 14 to the fan 18.

Each gear body 62 is formed to include a central opening 66 that is sized to receive a plain bearing 64 as shown in FIG. 4. The gear bodies 62 rotate around an axis 68 relative to the plain bearings 64 as the pinion gear 30 rotates and moves the planetary gears 32 around the central reference axis 13. The plain bearings 64 do not rotate relative to the axis 68 extending through the center of each plain bearing 64. Instead, the plain bearings 64 transfer torque from the power gearbox 14, through the mount 48, to the fan 18 as each of the plain bearings 64 are moved around the central reference axis 13 with the gear bodies 62.

The injectors 38 are fixed relative to the plain bearings 64 by mounting the oil tank 36 to the mount 48 for rotation with the planetary gears 32 around the central reference axis 13. The plurality of injectors 38 are illustratively embodied as side-jet injectors and each have an outlet 70 positioned directly adjacent to one of the plain bearings 64 as shown in FIGS. 4 and 5. Each injector 38 delivers a stream of lubrication to respective plain bearings 64 to reduce friction between the gear bodies 62 and respective plain bearings 64. The stream of lubrication may be forced out of the oil tank 36 through each of outlets 70 of the injectors 38 on demand due to the centrifugal forces imparted on the lubrication 52 in the oil tank 36.

In the illustrative embodiment, the outlets 70 are aligned circumferentially with a radially-outermost portion of the plain bearings 64 where the plain bearings 64 interface with the gear bodies 62 as shown in FIGS. 4 and 5. The outlets 70 are positioned slightly radially outward from the radially outermost portion so that the lubrication is injected directly into the interface between each of the gear bodies 62 and the plain bearings 64. In other embodiments, the outlets 70 may be circumferentially, axially and radially aligned with the interface between each of the gear bodies 62 and the plain bearings 64.

The oil tank 36 is formed to include a plurality of inlet apertures 80 formed in a radially inner wall 82 of the housing 46 as shown in FIG. 5. The plurality of inlet apertures 80 allow lubrication 52 to flow therethrough to maintain an adequate volume of lubrication 52 in the internal chamber 50. The lubrication may be pumped from another location, such as auxiliary oil tank 42, to the radially inner wall 82 so that centrifugal forces pull the lubrication through the inlet apertures 80 into the internal chamber 50. In the illustrative embodiment, the adequate volume of lubrication 52 is sufficient to provide a stream of lubrication to each plain bearing 64 for at least 4 seconds without the oil tank 36 being refilled with additional scavenged oil. Additionally, the oil tank 36 and/or the injectors 38 may be sized to deliver an appropriate flowrate to each of the plain bearings 64 for at least 4 seconds.

The lubrication system 16 may further include a second rotating oil tank 72 mounted aft of the planetary gearbox 14 as shown in FIG. 5. The second oil tank 72 is substantially similar to the oil tank 36 and includes a housing 74 and a mount 76 that attaches the second oil tank 72 to the plain bearings 64 for rotation about the central reference axis with the plurality of planetary gears 32. The second oil tank 72 may aid in delivering lubrication 52 to the entire length of the plain bearings 64 by providing multiple injection locations for each plain bearing 64. Alternatively, only one oil tank may be mounted either forward or aft of the planetary gearbox 14 for rotation therewith.

The lubrication system 16 may further include a control system 35 that includes a sensor 84 and a controller 86 as shown in FIG. 2. The sensor 84 is configured to measure changes in acceleration of the gas turbine engine 10 and output signals indicative of the changes in acceleration to the controller 86. The controller 86 includes a microprocessor and memory with instructions for processing the signals from the sensor 84 and outputting a command signal to cause the oil tank 36 to release the lubrication 52 when a predetermined threshold acceleration level is reached.

In the illustrative embodiment, the predetermined threshold acceleration level is reached when a zero gravity force event is sensed by the sensor 84. The controller 86 may output a command signal to one or more valves 88 to cause the valves 88 to open when the predetermined threshold acceleration level is sensed by the sensor 84. Alternatively, the valves 88 may be mechanically activated and configured to open automatically during a zero g-force event. The controller 86 is configured to close the valves 88 in response to the zero g-force event ending in some embodiments. In other embodiments, the valve 88 is open for normal operation and during zero g-force events.

In a zero g-force event, the gas turbine engine 10 may be considered to be weightless, falling without sufficient upward force to overcome gravity, or having a net downward force. During such events, oil in typical tanks may move relative to a bottom of the tanks where the outlet for the oil may be located. As such, oil flow may be stopped or reduced during the zero g-force event. In the present disclosure, the oil in tank 36 is urged against the outer wall of the tank 36 by centrifugal forces caused by rotation of the tank 36. The centrifugal forces are such that the oil in the tank 36 is urged toward the outer wall during normal gravity events and during zero g-force events because the centrifugal forces are greater than the gravity forces. Thus, the oil remains urged toward the wall and may continue to be used and directed toward the gears 32 during a zero g-force event.

In illustrative embodiments, a fluid reservoir 36 is provided into a power gearbox 14 in a cylindrical shape (i.e. a donut) to preserve a location where oil may be temporarily stored to disburse when a zero or negative gravity condition were present. This held amount of fluid would have specifically placed holes and oil jets in locations that may allow that fluid to flow to the power gearbox journal bearings for lubrication. This may alleviate a need for a fluid reservoir to be held beneath the power gearbox to provide the source of fluid for the auxiliary oil pump to draw oil from.

In illustrative embodiments, the present disclosure may facilitate packaging the gearbox inside the core of the engine by allowing for three-dimensional radial placement of the fluid. The tank may be located on both the forward and aft locations of the planetary gear system such that all journal bearing locations receive lubrication (if a journal bearing set-up were only 3 or 4 planetary gears the system would also work). In order for the tank to remain in a static location (relative to the planetary gears), the tanks may be mounted to the forward and aft zones via the rotating mount plate (which the planetary gears are providing the rotation for). The function of this set of oil tanks may also serve as the primary lubrication source for the gearbox 14 and/or engine 10 during normal operation. The oil may be fed into this system through a series of perforated sections on the innermost ring of the tanks.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core configured to provide power for the gas turbine engine, the engine core including a fan, a compressor, a combustor, and a turbine arranged along a central reference axis, and the turbine including a first turbine stage coupled with the compressor and configured to drive the compressor and a second turbine stage coupled with the fan and configured to drive the fan during use of the gas turbine engine,
a planetary gearbox coupled with the second turbine stage and the fan to transmit power from the second turbine stage to the fan during use of the gas turbine engine and the planetary gearbox including a plurality of gears configured to rotate about the central reference axis during use of the gas turbine engine, and
a lubrication system adapted to provide lubrication to the planetary gearbox, the lubrication system including an annular tank and a plurality of injectors in fluid communication with the annular tank and arranged to conduct lubrication to the planetary gearbox,
wherein the annular tank is coupled with at least one of the plurality of gears for rotation with the at least one of the plurality of gears about the central reference axis during use of the gas turbine engine to cause lubrication in the annular tank to overcome a force of gravity and form a ring of lubrication that supplies the plurality of injectors so that a flow of lubrication to the planetary gearbox through the plurality of injectors is maintained during a zero g-force event to prevent degradation of the planetary gearbox caused by a deficiency of lubrication during the zero g-force event,
wherein the annular tank includes a radial inner wall arranged circumferentially around the central reference axis and a radial outer wall arranged circumferentially around the radial inner wall and the radial inner wall is formed to define a plurality of feed holes to allow lubrication to flow radially outward through the radial inner wall into the annular tank and toward the radial outer wall.

2. The gas turbine engine of claim 1, wherein the plurality of gears include a pinion gear coupled with the second turbine stage, a plurality of planetary gears arranged circumferentially around the pinion gear, and a ring gear coupled with the fan and arranged circumferentially around the planetary gears and the annular tank is coupled with the plurality of planetary gears for rotation about the central reference axis with the plurality of planetary gears.

3. The gas turbine engine of claim 2, wherein the plurality of injectors are coupled with the annular tank for rotation with the annular tank about the central reference axis and the plurality of injectors are oriented to conduct lubrication from the annular tank toward the plurality of planetary gears so that lubrication is conducted continuously toward the plurality of planetary gears during rotation of the planetary gears and the annular tank about the central reference axis.

4. The gas turbine engine of claim 3, wherein each of the plurality of planetary gears includes a gear body and a plain bearing adapted to rotate about a shaft and the plurality of injectors are oriented to conduct lubrication into the plain bearings.

5. The gas turbine engine of claim 2, wherein the lubrication system further includes a controller configured to control a flow of lubrication to the plurality of injectors and the controller is configured to detect zero g-force events and allow the flow of lubrication to the plurality of injectors in response to detecting the zero g-force event and to block the flow of lubrication to the plurality of injectors in response to no zero g-force event being detected.

6. The gas turbine engine of claim 5, wherein the lubrication system further includes a second tank that is fixed relative to the central reference axis and a plurality of second injectors configured to supply lubrication from the second tank to the planetary gearbox.

7. The gas turbine engine of claim 1, wherein the plurality of gears include a pinion gear, a plurality of planetary gears arranged circumferentially around the pinion gear, and a ring gear arranged circumferentially around the planetary gears and the annular tank is rotatably coupled with one of the pinion gear and the ring gear for rotation about the central reference axis.

8. A gas turbine engine comprising
an engine core that includes a compressor, a combustor, and a turbine,
a planetary gearbox coupled with the turbine and including a plurality of gears configured to rotate about an axis during use of the gas turbine engine, and
a lubrication system that includes a tank and an injector in fluid communication with the tank and arranged to conduct lubrication to the planetary gearbox, and the tank being coupled with at least one gear included in the plurality of gears for rotation with the at least one gear about the axis during use of the gas turbine engine,
wherein the lubrication system further includes a controller configured to control a flow of lubrication to the injector and the controller is configured to detect zero g-force events and allow the flow of lubrication to the injector in response to detecting a zero g-force event and to block the flow of lubrication to the injector in response to no zero g-force event being detected.

9. The gas turbine engine of claim 8, wherein the plurality of gears include a pinion gear, a plurality of planetary gears arranged circumferentially around the pinion gear, and a ring gear arranged circumferentially around the planetary gears and the at least one gear is included in the plurality of planetary gears.

10. The gas turbine engine of claim 9, wherein the injector is coupled with the tank for rotation with the tank about the axis, the injector is fixed relative to the tank, and the injector is oriented to conduct lubrication from the tank toward one of the plurality of planetary gears.

11. The gas turbine engine of claim 8, wherein the lubrication system further includes a second tank that is fixed relative to the axis and a second injector configured to supply lubrication from the second tank to the planetary gearbox.

12. The gas turbine engine of claim 8, wherein the plurality of gears include a pinion gear, a plurality of planetary gears arranged circumferentially around the pinion gear, and a ring gear arranged circumferentially around the planetary gears and the tank is rotatably coupled with one of the pinion gear and the ring gear for rotation about the axis.

13. The gas turbine engine of claim 8, wherein the tank includes a radial inner wall arranged circumferentially around the axis and a radial outer wall arranged circumferentially around the radial inner wall and the radial inner wall is formed to define a plurality of holes that extend radially through the radial inner wall.

14. The gas turbine engine of claim 8, wherein the lubrication system further includes another tank coupled with the at least one gear for rotation about the axis, the another tank is spaced apart axially from the tank to locate the planetary gearbox axially therebetween.

15. The gas turbine engine of claim 8, wherein the tank is the only lubrication source that supplies lubrication to the planetary gearbox.

16. A method comprising
providing a planetary gearbox including a pinion gear coupled with an output shaft for rotation about a central reference axis with the output shaft and a plurality of planetary gears disposed radially outward from and circumferentially around the pinion gear,
mounting an oil tank to the planetary gearbox, and
rotating simultaneously the output shaft and the oil tank to impart centrifugal forces on lubrication contained within the oil tank such that the lubrication may be forced out of the oil tank by the centrifugal forces on demand,
wherein the oil tank is annular includes a radial inner wall arranged circumferentially around the central reference axis and a radial outer wall arranged circumferentially around the radial inner wall and the radial inner wall is formed to define a plurality of feed holes to allow lubrication to flow radially outward through the radial inner wall into the oil tank and toward the radial outer wall.

17. The method of claim 16, further comprising releasing a stream of oil from the oil tank toward each of the planetary gears during a zero-gravity event.

18. The method of claim 16, wherein each of the planetary gears includes an internal journal bearing and the oil tank is configured to inject oil onto each of the internal journal bearings to reduce degradation of the journal bearings.

\* \* \* \* \*